May 15, 1928.
W. W. CONNER
1,670,241
REMOVABLE VALVE STEM PROTECTOR
Filed Sept. 30, 1927
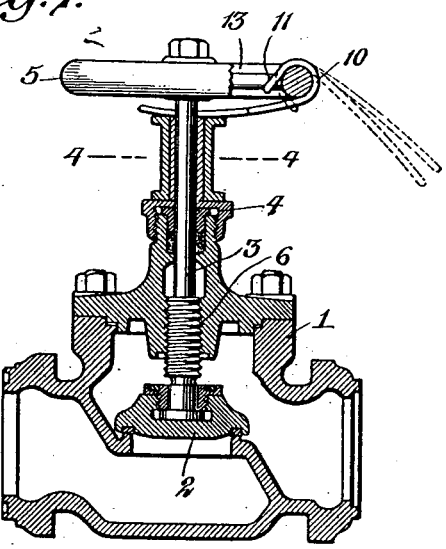
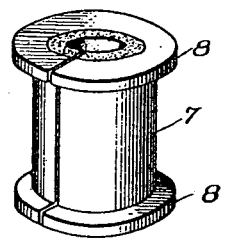
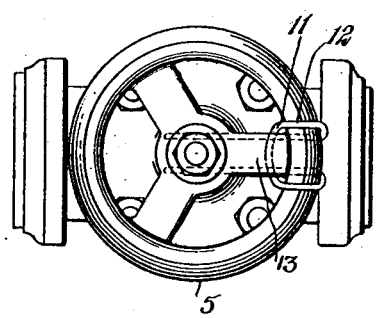
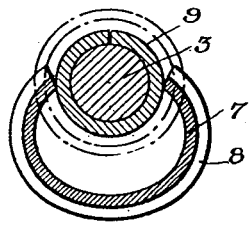
WITNESSES
INVENTOR
W. W. Conner
BY
ATTORNEY Patented May 15, 1928.

1,670,241

UNITED STATES PATENT OFFICE.

WILLIAM W. CONNER, OF SEWAREN, NEW JERSEY.

REMOVABLE VALVE-STEM PROTECTOR.

Application filed September 30, 1927. Serial No. 223,061.

This invention relates to a removable valve stem protector.

An object of the invention is to provide a protector which may be placed around the stem of a valve without removing the handwheel, or operating device secured to the stem and which will most efficiently protect the stem under all conditions.

In carrying out my invention I employ a ductile spool-like split sleeve which may be moved by hand to position the same on the valve stem or remove the same therefrom, and I provide in the sleeve a felt or other packing saturated with oil or other lubricant, and I provide a bendable spring which engages the handwheel of the valve and which functions to exert pressure on the sleeve to hold it in operative position against the stuffing box of the valve. The spring is capable of bending and other movement so as to disengage the same from the sleeve to allow the latter to be removed and replaced as occasion may require.

My device has many advantages, some of which may be enumerated as follows:

It protects the valve stem from corrosion, preserves the valve stem packing and prevents scale and rust being carried into the packing when the valve is closed.

It permits the valve stuffing box to be repacked without removing the handwheel from the stem, and this is an extremely important feature as it is difficult to remove the handwheel and in many cases the handwheel is riveted in place.

The sleeve is made of non-corrosive ductile metal such as lead or lead alloys and can be spread where the ends meet and removed with the fingers; and the felt pad employed as a packing within the sleeve is of high capillary properties to retain oil, and additional lubricant can be applied to the felt when required.

The device is practically indestructible and cannot become fouled and crushed when the valve is closed or opened.

The spring employed is preferably galvanized or protected with a non-corrosive coating.

The device prolongs the life of the valve stem and is not affected by low temperatures of the refrigerant in valve and pipe.

My device is of extremely simple construction, inexpensive to manufacture, and can be easily and quickly placed in position by any one of average intelligence, not requiring skilled labor and in no case requiring the removing of the handwheel from the stem.

Valves such as used in refrigerating systems are exposed to dampness and the elements of the weather and as the stems of the valves are ordinarily composed of soft steel they soon become corroded and pitted. With the ordinary valve when it is desired to change the packing of the stuffing box, it is necessary to remove the wheel and this is a very difficult problem. In my device this is altogether unnecessary and furthermore the device functions to prevent corrosion around the stem, and prevents any possibility of rust or foreign matter being forced into the stuffing box when the valve stem is moved. If foreign matter is carried down into the soft packing of the stuffing box it will cause the same to leak and hence it is a very important feature of my invention to eliminate this possibility.

With these and other objects in view, the invention consists in certain novel features of construction and combinations and arrangements of parts, which will be more fully hereinafter described and pointed out in the claims.

In the accompanying drawings—

Figure 1 is a view in longitudinal section illustrating my improved device in operative position on the valve;

Figure 2 is a top plan view of Figure 1;

Figure 3 is a perspective view of my improved sleeve;

Figure 4 is a view in section on the line 4—4, showing the sleeve expanded to position the same on the stem or remove the same from the stem of the valve.

The accompanying drawings illustrate my invention as applied to one type of valve and it is of course to be understood that I do not limit myself to the particular type of valve employed as my invention is applicable to various types.

1 represents the valve casing, 2 the valve, 3 the stem, and 4 the stuffing box through which the stem projects. 5 is the handwheel which is secured on the end of the stem and as the stem is screw-threaded, as shown at 6, the rotary movement of the stem moves the valve 2 from open to closed position and vice versa.

My improved sleeve 7 is located around the stem 3 of the valve and against the stuffing box 4, and comprises a split spoolshaped member of lead or other ductile material which is bendable to allow the sleeve to be spread, as shown in Figure 4, to place the same in position on the stem or remove the same from the stem.

This sleeve 7 is preferably provided with annular flanges 8 at its ends and is located around a felt or other packing 9 which encloses the stem. This packing 9 extends throughout the length of the sleeve and is adapted to be saturated with oil.

To hold the sleeve in proper position I provide a spring 10 which is composed of spring wire, suitably treated to protect it from injury from the elements. This spring wire 10 is bent intermediate its ends forming a loop 11 positioned under one of the spokes 13 of the wheel 5. The ends of the wire are then bent inwardly and located at opposite sides of the stem 3, and exert downward pressure on the sleeve 7.

When it is desired to remove the sleeve, the ends of the wire spring are spread apart so as to move them off of the end of the sleeve 7 and then the spring will assume the dotted line position shown in Figure 1, and be out of the way during the manipulation of the sleeve.

It is therefore apparent that the sleeve may be removed without removing the handwheel 5 so that the stuffing box 4 may be repacked as occasion may require.

While I have illustrated what I believe to be a preferred embodiment of my invention it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A device of the character described, including a split sleeve adapted to be positioned around the stem of a valve, and a spring adapted to be interposed between the valve handle and the sleeve and exert pressure on one end of the sleeve.

2. A device of the character described, including a bendable split sleeve adapted to bend around the stem of a valve, and resilient means adapted to be interposed between the valve handle and the sleeve and exert pressure on the end of the sleeve.

3. A device of the character described, including a split sleeve adapted to be positioned around the stem of a valve, a spring adapted to be interposed between the valve handle and the sleeve and exert pressure on one end of the stem, lubricant saturated packing material in the sleeve, and annular flanges on both ends of the sleeve.

4. A device of the character described, including a bendable split sleeve adapted to bend around the stem of a valve, resilient means adapted to be interposed between the valve handle and the sleeve and exert pressure on the end of the sleeve, lubricant saturated packing material in the sleeve, and annular flanges on both ends of the sleeve.

5. A device of the character described, including a split sleeve of ductile material adapted to be positioned around the stem of a valve, a lubricant saturated packing in said sleeve, and a spring adapted to be coupled to the handwheel of the valve and have removable engagement with one end of the sleeve whereby the sleeve is adapted to be held against the stuffing box of the valve.

6. In combination with a valve casing, a valve in the casing, a stuffing box on the casing, a valve stem connected with the valve and projecting through the stuffing box and a handwheel on the end of the stem, of a split ductile sleeve located around the stem and against the stuffing box, a lubricant saturated packing in said sleeve, and a spring connected to the handwheel and engaging the end of the sleeve to hold it against the stuffing box.

7. In combination with a valve casing, a valve in the casing, a stuffing box on the casing, a valve stem connected with the valve and projecting through the stuffing box and a handwheel on the end of the stem, of a split ductile sleeve located around the stem and against the stuffing box, a lubricant saturated packing in said sleeve, and a spring composed of wire bent intermediate its ends and looped under a spoke of the handwheel, and at its ends engaging the outer end of the sleeve at opposite sides of the stem and adapted to be spread apart to free the sleeve when the latter is to be removed from the stem or placed in position thereon.

Signed at New York, in the county of New York and State of New York, this 22nd day of September A. D. 1927.

WILLIAM W. CONNER.